Patented Jan. 10, 1928.

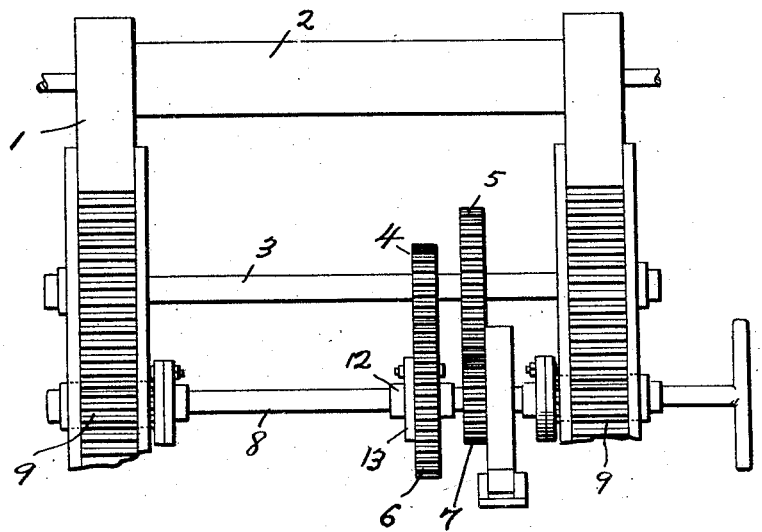
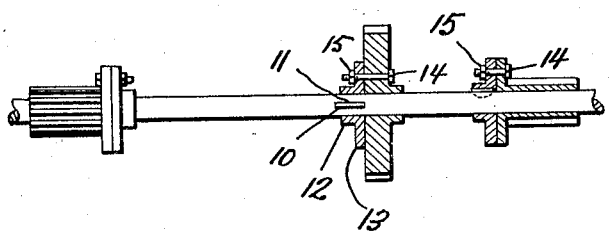

1,655,693

UNITED STATES PATENT OFFICE.

JAMES J. GOODWIN AND ROBERT L. PARR, OF COLUMBUS, GEORGIA; SAID GOODWIN ASSIGNOR TO SAID PARR.

SHEARING FLANGE.

Application filed April 1, 1926. Serial No. 99,174.

Our present invention has reference to improvements in cotton lapping or picking machines, and is designed to produce a simple means which insures the mechanism against injury incident to excess pressure.

To the attainment of the foregoing, the improvement resides in the construction, combination and operative association of parts, a satisfactory embodiment of which is illustrated by the accompanying drawings.

In the drawings:

Figure 1 is a detail elevation of the friction release mechanism of a lap rack.

Figure 2 is an elevation of the jack shaft to illustrate the application of my improvement thereon, parts being in section.

Referring now to the drawings in detail, the numeral 1 designates the lap racks of the well known construction, the same being provided with the usual logger-head 2 designed to overhang and exert pressure upon the lap shaft. It is, of course, well known to those skilled in the art to which this invention relates, that when the size of the roll of lap increases, the lap shaft 3 must be permitted to rise while held under sufficient pressure to effect a satisfactory rolling operation. The lap shaft 3 has fixed thereon toothed wheels 4 and 5, respectively, and these wheels are in mesh with similar wheels 6 and 7, that are loosely mounted on the jack shaft 8. In addition to the wheels 6 and 7, there are journaled on the ends of the jack shaft 8 pinions 9 which are in mesh with the teeth of the lap racks 1.

In carrying out our invention, we provide the jack shaft 8 with longitudinally extending inwardly rounded grooves 10, and in each of these grooved we arrange the curved lower portion of a key 11. Each key has its outer and straight edge received in a groove or channel in the hub portion 12 of discs 13. Each of the discs is fixed to the respective pinions or toothed wheels 6, 7 and 9—9 by a fragile pin 14. Preferably, each pin is headed, and has its shank threaded for engagement with a nut 15.

It will be apparent that when excessive pressure is delivered to the intermeshing wheels 4, and 6 or 5 and 7 or to the pinions 9, the fragile elements 14 will break, thereby releasing the pinions 6, 7 or 9—9 from locking engagement with the shaft 8 and as a result any tendency of breakage of the parts will be effectively overcome.

Having described the invention, we claim:

A motion transmitting device for a lap rack, including a lap rack shaft having toothed wheels thereon, a jack shaft, gears rotatable on the jack shaft meshing with said toothed wheels, pinions on said jack shaft meshing with the lap rack, a disk keyed upon the jack shaft adjacent the gears thereon, a readily frangible bolt member normally securing the disk to the adjacent gear for providing a driving connection, other disks keyed upon the jack shaft, and other readily frangible bolt members normally securing the second named disks to said pinions.

In testimony whereof we affix our signatures.

JAMES J. GOODWIN.
ROBERT L. PARR.